United States Patent [11] 3,607,404

| [72] | Inventor | Edward S. Buzzelli<br>Solon, Ohio |
|---|---|---|
| [21] | Appl. No. | 872,024 |
| [22] | Filed | Oct. 29, 1969 |
| [45] | Patented | Sept. 21, 1971 |
| [73] | Assignee | The Standard Oil Company<br>Cleveland, Ohio |

[54] ELECTRICAL ENERGY STORAGE DEVICE CONTAINING A BORON CARBIDE ELECTRODE
4 Claims, 1 Drawing Fig.

[52] U.S. Cl. .................................................. 136/6,
136/83 R, 136/100 R, 136/153
[51] Int. Cl. .................................................. H01m 35/02
[50] Field of Search .................................... 136/6, 83,
20, 100, 120, 121, 153, 155

[56] References Cited
UNITED STATES PATENTS

| 3,410,730 | 11/1968 | Rightmire et al. | 136/83 |
|---|---|---|---|
| 3,410,731 | 11/1968 | Rightmire et al. | 136/83 |
| 3,462,312 | 8/1969 | Rightmire et al. | 136/83 |
| 3,462,313 | 8/1969 | Rightmire et al. | 136/83 |

*Primary Examiner*—Winston A. Douglas
*Assistant Examiner*—C. F. Lefevour
*Attorneys*—John F. Jones and Sherman J. Kemmer ABSTRACT: An electrical energy storage device exhibiting high energy storage capacity comprises a novel boron carbide cathode and an aluminum-lithium alloy anode, the pair of electrodes being immersed in or in contact with a molten salt electrolyte composed of a lithium halide and one or more of the halides of the other alkali metals or the alkaline earth metals or combinations thereof.

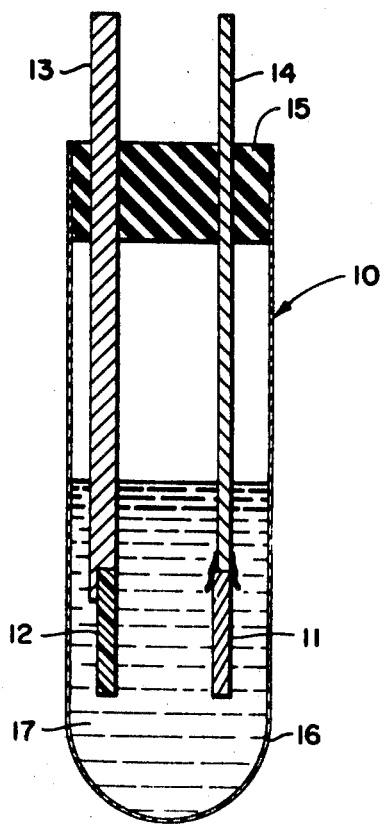

ELECTRICAL ENERGY STORAGE DEVICE CONTAINING A BORON CARBIDE ELECTRODE

This invention relates to a novel electrode for an electrical energy storage device and to the electrical energy storage device containing said electrode. More particularly, this invention relates to an electrode composed of boron carbide and the use of this electrode as a cathode in an energy storage device wherein the opposing electrode comprises aluminum or an alloy of aluminum and lithium and wherein said pair of electrodes are immersed in or are in contact with a molten salt electrolyte. The molten salt electrolyte comprises the halides of lithium as well as one or more of the halides of the other alkali metals or of the alkaline earth metals and combinations thereof.

The electrical energy storage capability of the electrodes is a very important factor in the total storage capacity of the energy storage cell as a whole. In accordance with this invention, it has now been discovered, unexpectedly, that an electrode composed of boron carbide, normally considered to be a relatively poor electrically conductive material, performs as a reversible positive electrode capable of high electrical energy storage. The cell containing said boron carbide electrode is capable of constant current discharge.

It is believed that the boron carbide electrode develops its capacity by means of a surface mechanism whereby an electrical charge is built up at the electrode-electrolyte interface. The greater the interface area the greater the capacity of the device. It is therefore necessary that the electrolyte encase substantially the entire geometric surface area of the electrode and uniformly impregnate it.

The boron carbide electrode of this invention may be fabricated into a porous plate by mechanically blending particles of boron carbide having a surface area in the range of from 100 to 1,500 m.$^2$/g. and mechanically pressing in a mold at elevated temperatures of from 50°C. to 200° C. and at pressures of from 100 p.s.i. to 4,000 p.s.i., or above the flow point of the binder if a binder is used. The maximum pressure limit is determined by the desired porosity in the finished electrode. After pressing, where the binder is used, the electrode is baked in an inert atmosphere at a temperature in the range of about 600° C. to 1,100° C. to cure and bake the binder. An inert gas, as for example, argon, helium or nitrogen, is used to control oxidation. After baking, during which considerable steam, carbon dioxide, and carbon monoxide are evolved, the electrodes are porous, physically strong and electrically conductive.

The boron carbide electrode may be prepared with or without a binder. Any available binder may be used, such as for example, carbonized phenolic resin or carbonized coal tar pitch.

Electrodes may also be prepared by hot pressing or sintering. Sintering is used herein to designate the state of the metal in which its particles begin to fuse without any appreciable change of form. In general, the temperature of sintering is such that the particles begin to coalesce, forming a coherent body with vacancies or voids between the individual particles, the importance of which in the present invention is to be discussed hereinafter.

Any method of electrode fabrication which produces a porous material is satisfactory. The porosity (voids between particles) of the boron carbide electrode should comprise from about 15 to 70 percent of the electrode volume in the fully discharged or reduced state, the voids between particles being sufficiently large to permit the electrolyte to enter freely and fill the voids of the electrode.

It is preferred that the electrode be "preconditioned" before use in an electric storage cell. "Preconditioning" of the electrodes as referred to in this invention constitutes the removal of easily degradable components in the structure of the electrode and the permeation of the electrode with electrolyte by alternately charging in a positive direction and then in a negative direction while in contact with the electrolyte. These steps amount to electrochemical oxidation and reduction reactions and are effective in removing all of the oxygen and most of the ash from the electrode.

The preconditioning treatment consists of immersing the boron carbide electrode in an excess of molten electrolyte and alternately charging the cell to 3.35 volts and then discharging to 0.7 volt open circuit. This charge-discharge cycle is repeated several times until the proper operating characteristics are obtained.

The anode may be any composition that is compatible with the electrolyte as well as with the electrical energy storage system as a whole. Preferred, however, is an anode composed of pure aluminum or an alloy of aluminum and lithium. If pure aluminum is employed, it is essential to precondition the electrode by repeated electrochemical cycling in the electrolyte.

The aluminum-lithium electrode can be produced by combining lithium with the aluminum by preparing a preformed alloy of aluminum and lithium, or, alternatively, electrochemically, by charging a substantially pure aluminum electrode in an electrolyte containing lithium ions to the extent of about 1 ampere hour per gram of aluminum whereby lithium is diffused into the aluminum electrode structure.

The aluminum-lithium alloy of the electrode comprises from about 70 to 95 weight percent aluminum and from about 5 to 30 weight percent lithium, based on total composition. Impurities such as, for example, copper, magnesium, manganese, indium and iron may be present in quantities less than 10 weight percent, based on total composition. An aluminum-lithium electrode in this composition range operates at substantially constant voltage and exhibits high energy storage capabilities.

The aluminum-lithium electrode, which functions best in a lithium halide electrolyte, is capable of storing lithium metal of the electrolyte without forming an extensive liquid. Hence, the electrode remains solid with the diffusion of lithium metal of the electrolyte through its structure.

The electrode material is preconditioned by slow charge and discharge initially. This slow preconditioning results in an electrode of substantially uniform aluminum-lithium distribution and high porosity and which electrode facilitates the takeup and release of the lithium metal upon the subsequent fast charge and discharge of a cell containing the electrode. Aluminum-lithium electrodes cycled by slow charge and discharge show a fine, even distribution of the lithium metal in the aluminum.

The electrolyte used in the device of this invention is a medium comprising a source of dissociated metal and halide ions which are mobile and free to move in the medium. Fused salt mixtures containing, for example, sodium chloride, calcium chloride, calcium fluoride, lithium chloride, potassium chloride, lithium bromide and potassium bromide can be used. These salts are particularly desirable from the standpoint of their low original cost. However other economic factors, such as the operating temperature, corrosiveness of the electrolyte or electrodecomposition products on the cell components and purification of the electrolyte must be considered. The lower melting point electrolytes are desirable. However, it is contemplated by the present invention that the electrolyte be operable at temperatures up to about 550° C. Additionally, if an aluminum anode is employed, the electrolyte must contain lithium ions.

Typical examples of materials which can be used as electrolytes include binary salt electrolytes such as lithium chloride-potassium chloride, lithium bromide-potassium bromide, lithium fluoride-rubidium fluoride, lithium chloride-lithium fluroide, lithium chloride-strontium chloride, calcium chloride-lithium chloride, lithium sulfate-potassium chloride and mixtures thereof.

Examples of ternary salt electrolytes are calcium chloride-lithium chloride-potassium chloride, lithium chloride-potassium chloride-sodium chloride, calcium chloride-lithium chloride-sodium chloride, and lithium bromide-sodium bromide-lithium chloride.

Especially preferred systems used with the aluminum-lithium electrode, are those of potassium chloride-lithium chloride and lithium bromide-potassium bromide, and mixtures thereof.

A lithium chloride-potassium chloride system of 41 mole percent potassium chloride and 59 mold percent lithium chloride forms a eutectic which melts at 352° C. The potassium chloride-lithium chloride eutectic has a decomposition voltage of about 3.65 volts.

The boron carbide electrode has a gradient discharge curve sloping downwardly. The discharge curve can be altered, and the capacity for storing electrical energy can be increased considerably by incorporating a tellurium compound directly into the electrolyte or into the boron carbide electrode. By applying a cyclic charge and discharge to the system, the tellurium becomes permanently bonded to the boron carbide of the cathode forming an active tellurium species. The formation of the active tellurium species is characterized by a reaction plateau appearing in the discharge curve of the electrode above about 2.0 volts.

The tellurium may be added to the system as any tellurium compound that is soluble in the electrolyte, stable in the environment of the cell and is compatible with the ions of the system so that metals foreign to the system will neither contaminate nor plate out on the surface of the metallic anode. Those compounds suitable for the purpose of addition include tellurium metal, tellurous and telluric halides, oxides, and acids, the tellurides and the tellurate and tellurite salts of the alkali and alkaline earth metals. Examples of these compounds include $TeCl_2$, $TeCl_4$, $TeBr_2$, $TeBr_4$, $TeI_2$, $TeI_4$, $TeF_2$, $TeF_4$, $TeO$, $TeO_2$, $TeO_3$, $K_2TeO_3$, $K_2TeO_4$, $Na_2TeO_3$, $Na_2TeO_4$, $Li_2TeO_3$, $Li_2TeO_4$, $MgTeO_3$, $MgTeO_4$, $H_2TeO_3$, $H_2TeO_4$, $K_2TE$, $Na_2TE$, $Li_2TE$, $MgTe$, and the like. The preferred compounds are those containing cations or anions that are already present in the system. Those particularly suitable are the tellurium halides and the tellurates, tellurites and tellurides of lithium and potassium.

The amount of tellurium required in the system to bring about a discernible enhancement in energy storage capacity is more dependent upon the design of the cell and the rate of reaction in forming the "active" tellurium-boron carbide complex, than by the rate of diffusion of tellurium into the cathode. Sufficient amounts of tellurium metal should be present in the system to drive the reaction forming the "active" tellurium species to completion. However, not so great an excess of tellurium should be present so as to cause excessive leakage current. Tellurium may be added to the electrolyte or to the carbon electrode in amounts such that the conditioned cathode contains from 5 to 40 percent by weight, and preferably from 10 to 35 percent by weight, of tellurium metal, based on the weight of boron carbide.

A more complete disclosure of the tellurium additive and its use in a molten salt energy storage cell is given in a copending U.S. Pat. application Ser. No. 808,876 filed Mar. 20, 1969.

Referring more particularly to the drawing, a schematic test cell 10 of the present invention is shown. Boron carbide electrode 12 and opposed aluminum-lithium electrode 11 are positioned one from another in spaced relationship, immersed in an electrolyte 17 and held in a heat resistant glass tube 16. The boron carbide electrode 12 is fixed rigidly to a graphite current carrier 13 and aluminum-lithium electrode 11 is fixed rigidly to a steel current carrier 14. The container holding the electrolyte and electrodes is purged of atmospheric air and an inert gas introduced into the container. The open end of the container is then sealed with a cap 15, of inert material, such as lava or ceramic.

In operation, potassium chloride crystals and lithium chloride crystals were mixed in a proportion of 59 mole percent lithium chloride and 41 mole percent potassium chloride, and dried at about 500° C. for 2 hours and introduced to an electric storage cell container as illustrated in the drawing, containing a boron carbide cathode and an opposed negative aluminum-lithium alloy electrode of 18 weight percent lithium to a level about one-half inch above the electrodes. The two electrodes were connected through an external circuit capable of supplying constant current or constant voltage to the cell. The electric storage cell was placed in an electric furnace at 500° C.

The cell was preconditioned in the furnace by charging the cell to 3.35 volts, open circuit, and discharging to about 0.7 volt, open circuit, and back to 3.35 volts, open circuit. Additional cycling in this manner may be necessary until constant discharge is obtained. Chemical preconditioning methods external to the cell may also be used.

It has been found that an energy storage cell so prepared has demonstrated energy storage twice as great as presently known electrical energy storage cells.

The device of the present invention operates more efficiently in a pressure range of about 1 p.s.i.g. to 200 p.s.i.g. under an atmosphere of inert gas (e.g. helium, argon, krypton) and at a temperature of from about 350° C. to about 500° C.

Since the electrical energy storage device operates at or above the fusion temperature of the electrolyte, the above-mentioned electrolytes are provided a means of heating to insure their remaining in the molten state.

The electrical energy storage units herein described lend themselves to connection with units of similar construction either by connection of a number of units in series and parallel or by utilization of a stack of electrodes.

Example 1

A porous boron carbide cathode was prepared according to the following procedure:

Ten grams of boron carbide were mixed with 2 grams of phenol-formaldehyde thermosetting resin binder (Borden Chemical Company). The mixture was pressed in a 1¼ inch mold at 4,000 p.s.i. and at a temperature of 175° C. The electrode was removed from the mold and presoaked in an argon atmosphere at 200° C. for 2 hours and then baked in an argon atmosphere of 900° C. for 16 hours. The electrode contained 0.01 inches$^3$ of boron carbide and had a density of about 1.0 g./cc.

An energy storage cell, similar to that shown in FIG. I, was assembled in a stainless steel test tube (inside volume 2 inches$^3$). Into this test tube were placed the above prepared boron carbide cathode and an aluminum-lithium alloy anode, obtained from a one-quarter inch rod of the alloy, 1 inch in length and containing approximately 15 weight precent lithium. The electrodes were immersed in an electrolyte containing approximately 125 grams of a eutectic salt mixture having the composition of 59 mole percent lithium chloride and 41 mole percent potassium chloride (melting point 352° C.). An argon atmosphere was provided in the cell and the cell was operated at a temperature between 450 and 500° C. The electrodes were conditioned in the electrolyte by repeatedly charging the cell to 3.35 volts and then discharging at a constant current to 1.0 volt. The cell was cycled for 50 cycles at a constant discharge of 10 milliamperes. The boron carbide electrode exhibited a capacity of 1.2 ampere-hours per inch$^3$.

Example 2

The conditions employed in example 1 were repeated with the exception that 0.5 gram of potassium telluride were added to the electrolyte. The electrodes were conditioned by cycling while immersed in the electrolyte containing the potassium telluride at a constant discharge of 50 milliamperes. The boron carbide electrode containing chemically bonded tellurium had a capacity of 2.7 ampere-hours per inch$^3$.

Example 3

Example 1 was repeated, with the exception that the electrolyte consisted of a mixture of equal amounts, by weight, of potassium bromide and lithium bromide. The electrodes were conditioned in the electrolyte by charging the cell to 3.0 volts and then discharging at a constant current to 1.0 volt. At a constant discharge of 50 milliamperes, the boron carbide electrode in this system demonstrated a capacity of 2.0 ampere-hours per inch$^3$.

Example 4

Example 3 was repeated with the addition of 0.5 grams of potassium telluride to the electrolyte. At a constant discharge of 50 milliamperes, the boron carbide electrode containing the boron carbide-tellurium complex had a capacity of 2.7 ampere-hours per inch$^3$.

I claim:
1. An electrical energy storage device comprising:
   a. a container;
   b. a fused salt electrolyte comprising lithium halide and one or more of the halides of the other alkali metals or of the alkaline earth metals and mixtures thereof in said container; and
   c. a positive and a negative electrode spaced from one another immersed in said electrolyte, the negative electrode is selected from the group consisting of aluminum and an alloy of aluminum and lithium, the positive electrode consisting of boron carbide containing an electrochemically formed complex of tellurium and boron carbide; said electrolyte encases substantially the entire geometric area of said positive electrode; said electrical energy storage device being operable above the melting point of the electrolyte.

2. The electrical energy storage device of claim 1, wherein the negative electrode is composed of an alloy having the composition 70 to 95 weight percent of aluminum and 5 to 30 weight percent of lithium.

3. The electrical energy storage device of claim 2 wherein the electrolyte consists essentially of a eutectic mixture of lithium chloride and potassium chloride.

4. The electrical energy storage device of claim 1 wherein the positive electrode contains from 5 to 40 percent by weight of tellurium metal based on the weight of boron carbide.